Sept. 29, 1953     L. K. RUDD ET AL     2,653,733

MIXING FUNNEL FOR BEVERAGE VENDING MACHINES

Filed June 2, 1950

INVENTOR
Lloyd K. Rudd
K. Cyrus Melikian

BY Albert M Zalkind

ATTORNEY

Patented Sept. 29, 1953

2,653,733

UNITED STATES PATENT OFFICE 2,653,733

MIXING FUNNEL FOR BEVERAGE
VENDING MACHINES

Lloyd K. Rudd, Newtown Square, and Khoren
Cyrus Melikian, Philadelphia, Pa.

Application June 2, 1950, Serial No. 165,634

3 Claims. (Cl. 222—145)

This invention relates to beverage vending machines and more particularly to a funnel for use in conjunction with such a machine for mixing a plurality of fluids which issue from respective reservoirs.

It is an object of our invention to provide a simple device for collecting and mixing various fluids dispensed by a beverage vending machine and particularly a machine as disclosed in our co-pending application, Serial Number 7,484, filed February 10, 1948, for Coffee Vending Machine.

It is a further object of our invention to provide a mixing funnel of simple construction and combined in such a manner with the machine disclosed in the application referred to above that it will be kept clean at all times.

It is another object of our invention to provide a funnel so devised that it may be quickly removed from the machine for inspection or substitution.

In general, our invention comprises a funnel disposed below the outlet tubes of a beverage-dispensing mechanism in such a manner as to catch the flow therefrom. A port is provided in the funnel adjacent the upper rim thereof and this port is connected to the water reservoir of our machine. As will be understood from the prior application, the various fluids, including hot water, dispensed by our machine, are flow-controlled by means of rotating cams, which operate switches in turn controlling solenoid valves. Thus, it will readily be understood by persons skilled in the art that the sequence of flow of selected fluids may be readily determined by selective phasing of the cams. Accordingly, if the cam which controls the flow of hot water be suitably set, it is obvious that hot water can be made to flow subsequent to the end of flow of the other extracts, or fluids. Since such other fluids are normally food products, such as coffee extract, cream, and simple syrup, they would leave an undesirable residue in the funnel or in any other device utilized for mixing them prior to pouring into a cup. However, as will become apparent, by setting the control cams so that hot water continues to flow after the other fluids have ceased flowing, the interior area of our mixing funnel is effectively flushed and thereby a sanitary condition insured.

Our invention will now be described in conjunction with the appended drawing in which Figure 1 shows partially diagrammatically the combination of a beverage dispensing mechanism and our novel mixing funnel.

Figure 3:
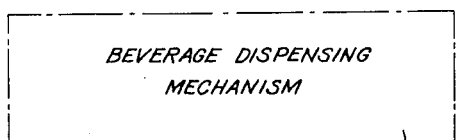
Figure 3 is a section through 3—3 of Figure 2.
Figure 3:
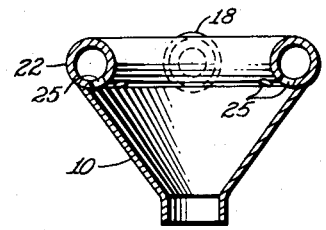
Figure 1:
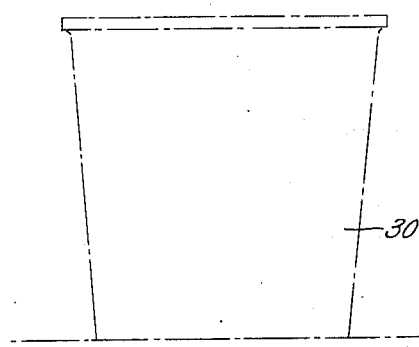
Figure 2:
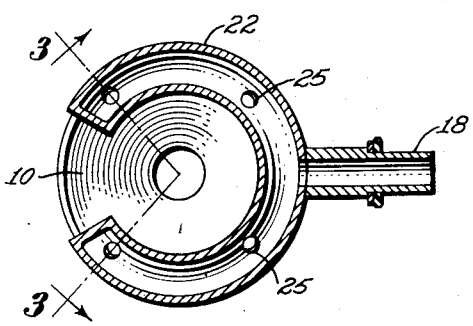
Figure 2 is a section through 2—2 of Figure 1.

With reference now to Figures 1 through 3, our invention comprises the combination, as well as the funnel element per se, of a funnel-like member 10 disposed below a beverage dispensing mechanism 13 which is indicated diagrammatically. A plurality of outlet tubes 15 are shown as depending from the beverage dispensing mechanism 13, and it will be assumed that such mechanism contains control cams all as hereinabove described and as specifically disclosed in our prior application. A water tube 18 connects to a conduit 22 disposed substantially around the upper rim of the funnel 10 and preferably being formed integrally therewith. The conduit 22 is provided with a plurality of perforations 25 and it will be appreciated that water from tube 18 will fill conduit 22 and emanate from ports 25 to impinge against the inside area of funnel 10 for cleansing thereof. Thus, since this water is the hot water used as an ingredient in making a cup of coffee as fully described in our previous application, it will be apparent that our funnel uses this hot water as an effective cleansing fluid.

Figure 1 is completed by the representation of a cup 30 disposed below funnel 10 and it will be appreciated that all fluids from tubes 15 as well as tube 18 are thus directed downwardly into the cup, the water flow being completed last.

Figure 4:
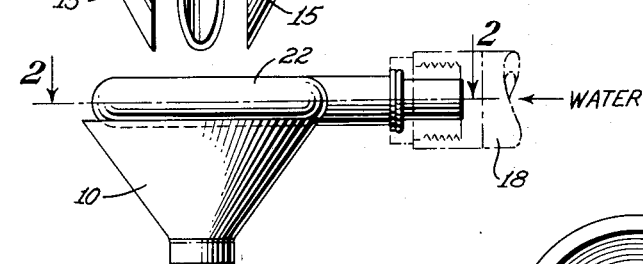
Figure 4 is a plan view of another form of our funnel.
Figure 4:
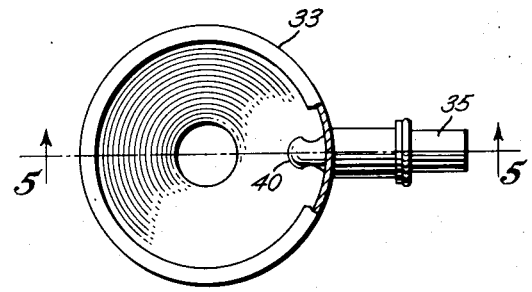
Figure 5:
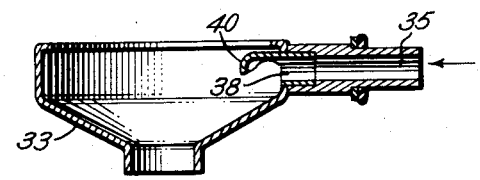
Figure 5 is a section through 5—5 of Figure 4.

In the form shown in Figures 4 and 5, we utilize a funnel 33 having a water passage 35 and a single port 38 provided with a baffle 40 so disposed as to have the water impinge thereon for general distribution around the walls of the funnel in a manner which will be clearly understood from consideration of Figure 5.

While only two forms are herein disclosed, it will be appreciated that our mixing funnel may be devised in a variety of forms and accordingly we do not seek to be limited to the specific illustrations except as set forth in the appended claims.

We claim:

1. The combination of a beverage-dispensing mechanism having a water-dispensing passage and a mixing funnel for blending water with at least one other fluid for effecting a potable mixture, fluid-dispensing outlet means disposed for directing flow into said funnel at the top thereof, said funnel having port means adjacent an upper rim thereof, said port means being disposed to direct water flow against the interior wall of said funnel and said water passage communicating with said port means, whereby the interior of said funnel may be water-cleansed subsequent to dispensing a beverage fluid, said mechanism having means for dispensing water subsequent to dispensing other fluid into said funnel, whereby the interior wall of said funnel is cleansed of residue of said other fluid.

2. A mixing funnel as set forth in claim 1 wherein said port means comprises a perforated conduit disposed around the major portion of said top rim.

3. A mixing funnel as set forth in claim 1 wherein said port means comprises an opening in the wall of said funnel, and baffle means disposed in said funnel and adapted to have the flow from said port impinge thereon for distribution to the internal area of said funnel.

LLOYD K. RUDD.
KHOREN CYRUS MELIKIAN.

References Cited in the file of this patent

UNITED STATES PATENTS

| Number | Name | Date |
|---|---|---|
| 1,337,185 | Corry | May 10, 1921 |
| 1,627,147 | Clark | May 3, 1927 |
| 1,980,931 | Rothermel | Nov. 13, 1934 |